A. PELTIER & M. HOERNING.
COMBINED AQUARIUM, FOUNTAIN AND FLOWER-STAND.
No. 188,941. Patented March 27, 1877.
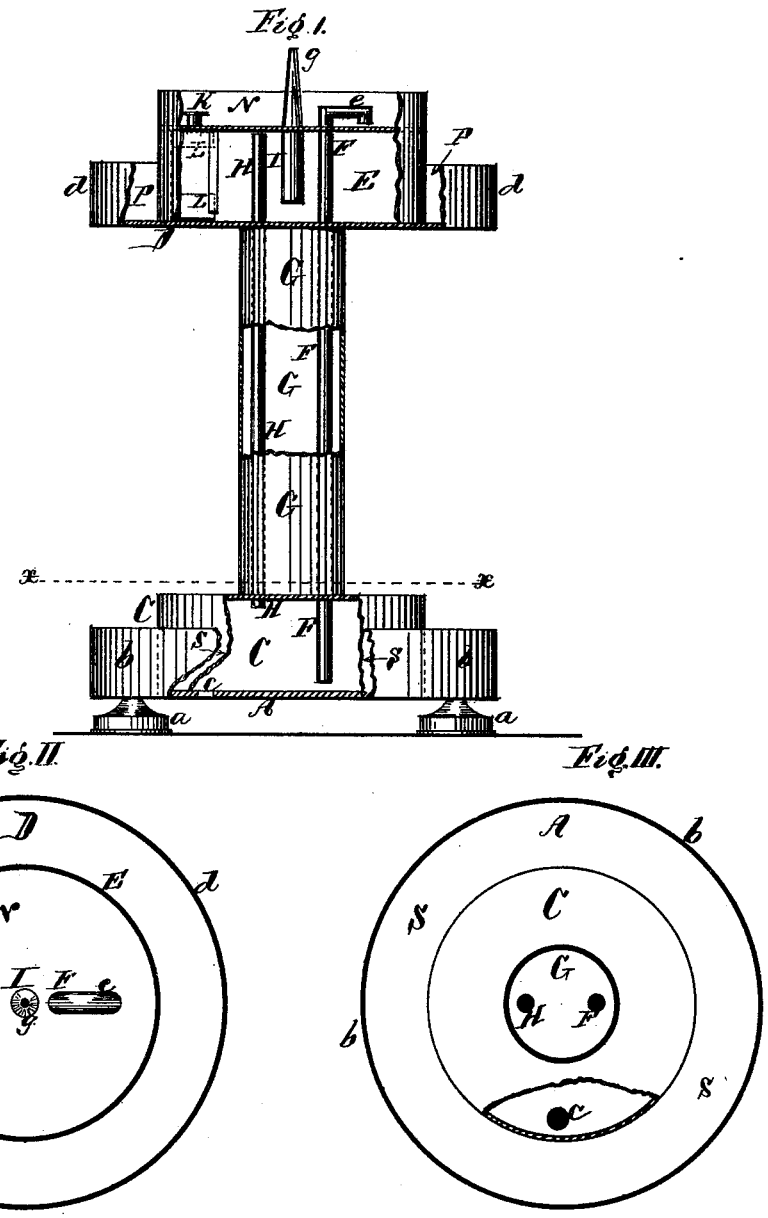

UNITED STATES PATENT OFFICE.

ALPHONSE PELTIER AND MATTHEW HOERNING, OF WILLIAMSBURG, N. Y.

IMPROVEMENT IN COMBINED AQUARIUM FOUNTAIN AND FLOWER-STAND.

Specification forming part of Letters Patent No. 188,941, dated March 27, 1877; application filed December 19, 1876.

*To all whom it may concern:*

Be it known that we, ALPHONSE PELTIER and MATTHEW HOERNING, both of Williamsburg, Kings county, State of New York, have invented new and useful Improvements in Combined Fountain Flower-Stand and Aquarium; and we hereby declare that the following is a clear and exact description of our invention, which will enable others to make and use the same, reference being had to the accompanying drawings, forming a part of this specification, and to the letters and figures of reference marked thereon.

The object of our invention is to provide for a compact and ornamental stand or table, which is so constructed that it serves for a combined flower-stand, a fish-tank, or aquarium, and an automatic fountain.

Referring to the drawings, Figure I is an elevation view, partly in section, of our combined fountain, flower-stand, and aquarium. Fig. II is a top view, and Fig. III is a plan sectional view on line $x\,x$, Fig. I.

A is the base with legs $a\,a$ and rim $b$. On the top of this base is formed an air-tight reservoir, C, which is provided with an opening, $c$, at the bottom, and is closed by aid of a stop-cock or threaded nut. Between the reservoir C and the rim $b$ is formed an annular space, S', for the purpose of placing therein flowers. To the top and center of the reservoir C is fastened a vertical hollow standard, G, to the top of which is fastened a circular disk or platform, D, which is provided with a rim, $d$. To the top of this platform is secured an air-tight vessel or reservoir, E, similar to reservoir C. Between the reservoir E and the rim $d$ is formed a similar annular space, P, as below, around the reservoir C, and also designed to be filled with flowers. On the top of reservoir E is formed a tank or water-reservoir, N, for the reception of plants, minerals, and fishes generally placed in an aquarium. This tank is made preferably of glass in any desired form. Through the top of reservoir E is introduced and fastened the tube F, which is provided at the top with the bend or elbow $e$, for the purpose of preventing the tube from being clogged from the contents of the aquarium. The tube F descends through the interior of the standard G and through the top of reservoir C near to the base A. H is another tube extending through the top of reservoir C and through the interior of the standard G into the reservoir E nearly to the top of the same. To the top and center of reservoir E is fastened the tube I, which descends nearly to the bottom of this reservoir and ascends above the top of the same and also over the top of the aquarium and its contents, terminating in the contracted nozzle $g$. Through the top of reservoir E is provided an opening through the capped tube K. This tube is automatically closed from below by aid of the swimmer L, when the same is forced up against the end of the tube.

The operation of the fountain is as follows: The reservoir E is filled with water through tube K until the swimmer L is forced up against the lower end of the tube. Water is then poured into the tank N nearly up to the top, and the water will consequently run through tube F into the reservoir C, and expel the air from the same through tube H into the reservoir E, where the thus compressed air pressing on the top of the water in the same causes the water to be elevated through tube I and nozzle $g$ into the tank N. After a certain time the fountain will cease to flow, and the water in reservoir C must then be removed through the opening $c$, in order to restore the conditions, to attain the play of the fountain.

Having thus described our invention, we desire to claim—

The base A with rim $b$, the reservoir C with opening $c$, the annular space S', the hollow standard G, the platform D with rim $d$, the reservoir E with swimmer L, the annular space P, and the tank N with tube K, in combination with the tubes F, H, and I with nozzle $g$, substantially as described, and for the purpose set forth.

ALPHONSE PELTIER.
MATTHEW HOERNING.

Witnesses:
RICHD. GERNER,
F. BARRETT.